Oct. 4, 1949.  E. A. WATSON ET AL  2,483,950
POWER TRANSMISSION MECHANISM
Filed Dec. 11, 1944
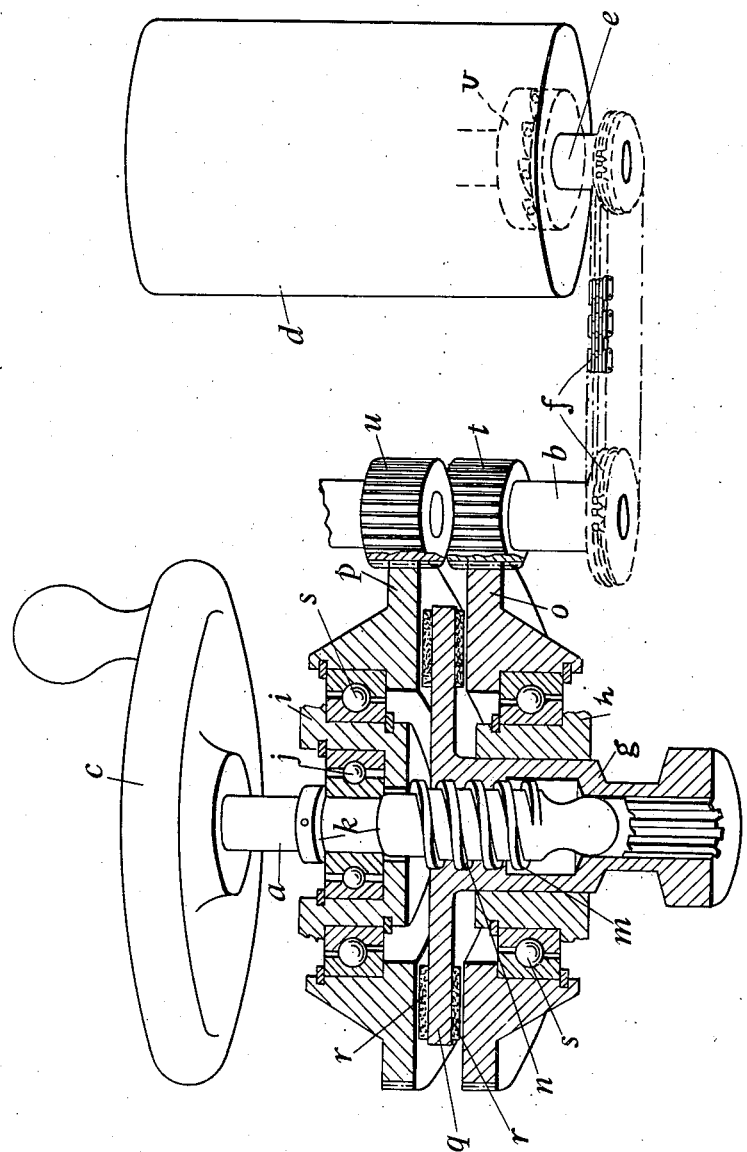
Inventors
E. A. Watson
F. T. Shaw
By Hiscock Downing Seebold
Attys Patented Oct. 4, 1949

2,483,950

UNITED STATES PATENT OFFICE 2,483,950

POWER TRANSMISSION MECHANISM

Ernest Ansley Watson and Frederick Talbot Shaw, Birmingham, England, assignors to Joseph Lucas Limited, Birmingham, England Application December 11, 1944, Serial No. 567,610
In Great Britain June 30, 1943

Section 1, Public Law 690, August 8, 1946
Patent expires June 30, 1963

3 Claims. (Cl. 74—625)

This invention has for its object to provide an improved power transmission mechanism adapted to be actuated alternatively by hand or by any other power source.

The accompanying drawing is a diagrammatic perspective sectional view of a reversible power transmission mechanism constructed in accordance with the invention.

In carrying the invention into effect as shown, we employ a pair of input-shafts $a$, $b$ arranged parallel with each other. The shaft $a$ is adapted to be driven by hand, and has secured on one of its ends an operating hand wheel $c$. The other shaft $b$ is adapted to be connected to an alternative power source, which may be, for example, an electric motor $d$, through a unidirectional clutch of known form and, if desired, appropriate reduction gearing. The unidirectional clutch may conveniently be combined with the shaft $e$ of the motor $d$, and the reduction gearing may consist of chain-and-sprocket mechanism $f$. Arranged in coaxial alignment with the hand driven shaft $a$ is a hollow output-shaft $g$ which is supported by a fixed bearing $h$, and which has both rotational and endwise freedom relatively to the said bearing. The hand driven shaft $a$ is rotatably supported by another fixed bearing $i$ through the medium of a ball bearing $j$, and the latter serves by contact with annular abutment surfaces $k$ on the hand driven shaft to prevent appreciable endwise freedom of this shaft relatively to its supporting bearing. The hand driven and output-shafts $a$, $g$ are interconnected by the engagement of a screw-thread $m$ on the hand driven shaft with a complementary screw-thread $n$ in the output-shaft, so that rotation of the hand driven shaft can serve to impart to the output-shaft both rotational motion and a limited amount of endwise movement. Instead of a screw-thread connection any other equivalent helical connection may be provided between the hand driven shaft and the output-shaft so long as this connection enables both rotational motion and a limited amount of endwise movement to be imparted to the output shaft by rotary motion of the hand driven shaft.

Arranged coaxially with the hand driven and output-shafts $a$, $g$ are a pair of annular toothed discs or wheels $o$, $p$ forming members of a friction clutch, and between these clutch members is mounted a complementary clutch member $q$ in the form of an annular disc formed on or secured to the output shaft $g$, any convenient friction material $r$ being mounted on the faces of the latter clutch member for co-operating with the adjacent faces of the other clutch members. The toothed wheels $o$, $p$ are respectively supported by the bearings $h$, $i$ through the medium of ball bearings $s$ which serve to prevent axial movement of the toothed wheels. In engagement with the toothed wheel $o$ is a pinion $t$ formed on or secured to the input-shaft $b$ which receives motion from the electric motor $d$ (or other alternative power source), and in engagement with the other toothed wheel $p$ is another and similar pinion $u$ the two pinions being also in engagement with each other so that rotation of the input-shaft $b$ causes the two toothed wheels to rotate in opposite directions.

When it is required to transmit motion to the output-shaft $g$ by hand, the hand driven input-shaft $a$ is actuated in the desired direction. This has the effect of bringing the clutch member $q$ on the output-shaft $g$ into engagement with one or the other of the toothed wheels $p$, $o$ (due to the resultant endwise movement of the output-shaft), and so causes the other input-shaft $b$ to be driven idly. No motion is however communicated to the electric motor $d$ or other power source owing to the intervention of the unidirectional clutch $v$ above mentioned. When the limited endwise freedom of the output-shaft $g$ has been taken up (this being determined by the inter-engagement of the friction clutch members $q$, $p$ or $q$, $o$) continued rotation of the hand driven input-shaft $a$ causes the output-shaft to be rotated.

When it is required to actuate the output-shaft $g$ from the electric motor $d$ (or other alternative source), this latter is set in motion causing the other input-shaft $b$ to be driven through the unidirectional clutch. The effect of the motion of this input-shaft $b$ is to rotate the toothed wheels $o$, $p$ in opposite directions through the pinions $t$, $u$. To connect either of the toothed wheels $o$, $p$ to the output shaft $g$ the intermediate friction clutch member $q$ is moved into engagement with that wheel by appropriate rotation of the hand driven shaft $a$, and the motion of the latter shaft must be continued so long as it is required to keep the alternative power source in action. On ceasing the motion of the hand driven shaft $a$, the friction clutch member $q$ automatically goes out of action and ceases to transmit motion to the output-shaft $g$ from the alternative power source.

If it be required to provide a mechanism for transmitting motion from either of a pair of input-shafts to an output-shaft in one direction only, one of the toothed wheels above mentioned is omitted.

The invention is not, however, restricted to the examples above described, as details of arrangement and construction may be varied to suit different requirements.

The invention is applicable to a variety of purposes, but it is more especially intended for use in winches, cranes, gun-laying mechanisms, and the like, where it is required to be able to operate a mechanism either by hand or by an alternative power source and to provide a convenient hand control of the motion derived from the alternative source.

Having thus described our invention what we do claim as new and desire to secure by Letters Patent is:

1. Power transmission mechanism comprising the combination of a manually operable input-shaft, a second input-shaft, an output-shaft having a helical connection with the manually operable input-shaft, means whereby the manually operable input shaft and the output-shaft are rotatably supported so as to permit relative endwise movement thereof, and a friction clutch having at least two rotatable and frictionally interengageable members one of which is provided on and movable towards and away from the other member by endwise movement of one of the said shafts, the said other member being drivingly connected with said second input shaft, said members serving by engagement with each other to enable rotary motion to be imparted to the output-shaft either from the input-shaft or through the clutch as required.

2. Power transmission mechanism comprising in combination a manually rotatable input-shaft, a second and independently rotatable input-shaft, a rotatable and endwise movable output-shaft having a helical connection with the manually rotatable input-shaft, and a friction clutch having at least two rotatable and frictionally interengageable members one of which is provided on the output-shaft and movable towards and away from the other by endwise movement of the output-shaft, and which serve by engagement with each other to enable rotary motion to be imparted to the output-shaft from either of the input-shafts as required, the second input-shaft being operatively connected to the last mentioned clutch member, and the clutch being dependent for its action on continued operation of the manually rotatable input-shaft.

3. Power transmission mechanism as claimed in claim 2, the said other member being in the form of a disc, a second clutch disc coaxial therewith and having a connection with said input shaft by which the second disc is driven in the direction opposite to that of the other disc, and said one member being disposed between said discs.

ERNEST ANSLEY WATSON.
FREDERICK TALBOT SHAW.

REFERENCES CITED

The following references are of record in the file of this patent:

UNITED STATES PATENTS

| Number | Name | Date |
|---|---|---|
| 754,757 | Ellicott et al. | Mar. 15, 1904 |
| 1,763,470 | Lemon | June 10, 1930 |
| 1,858,624 | Hess et al. | May 17, 1932 |
| 2,262,330 | MacNeil et al. | Nov. 11, 1941 |

FOREIGN PATENTS

| Number | Country | Date |
|---|---|---|
| 792,380 | France | Dec. 30, 1935 |